(12) United States Patent
Stark et al.

(10) Patent No.: US 7,125,235 B1
(45) Date of Patent: Oct. 24, 2006

(54) PRESSURIZED PLATE-HEATED MATERIAL DIE AND METHOD OF CONSTRUCTING A PRESSURIZED PLATE-HEATED DIE

(76) Inventors: Patricia A. Stark, 12567 SW. Pembrooke Cir. N., Lake Suzy, FL (US) 34269; Jon Zook, 8101 Country Rd., #104, Ft. Meyers, FL (US) 33919

( * ) Notice: Subject to any disclaimer, the term of this patent is extended or adjusted under 35 U.S.C. 154(b) by 289 days.

(21) Appl. No.: 10/724,673

(22) Filed: Dec. 1, 2003

Related U.S. Application Data

(60) Division of application No. 10/724,672, filed on Dec. 1, 2003, now Pat. No. 7,036,291, which is a continuation-in-part of application No. 10/378,183, filed on Mar. 3, 2003, now Pat. No. 6,823,653.

(51) Int. Cl.
*B29C 47/92* (2006.01)
*B29C 47/08* (2006.01)
*B23P 11/00* (2006.01)

(52) U.S. Cl. .............. 425/170; 425/192 R; 425/378.1; 29/525.01; 29/525.11

(58) Field of Classification Search ................ 425/170, 425/190, 192 R, 376.1, 378.1; 222/146.5; 29/525.01, 525.02, 525.11, 525.12
See application file for complete search history.

(56) References Cited

U.S. PATENT DOCUMENTS

| | | | | |
|---|---|---|---|---|
| 3,864,068 A | * | 2/1975 | Flakne | 425/192 R |
| 4,069,092 A | * | 1/1978 | Zink et al. | 156/500 |
| 4,462,780 A | * | 7/1984 | Stavitsky et al. | 425/144 |
| 4,828,479 A | * | 5/1989 | Pleasant | 425/192 R |
| 4,959,002 A | * | 9/1990 | Pleasant | 425/192 R |
| 5,261,806 A | * | 11/1993 | Pleasant | 425/144 |
| 5,679,379 A | * | 10/1997 | Fabbricante et al. | 425/7 |
| 2005/0046090 A1 | * | 3/2005 | Allen et al. | 264/555 |

* cited by examiner

*Primary Examiner*—Joseph S. Del Sole
(74) *Attorney, Agent, or Firm*—Edward P. Dutkiewicz

(57) ABSTRACT

A pressurized, plate-heated die system has a distribution plate. A material feed tube is coupled to a material feed aperture in the die. The die has a U-shaped shim, a first insulator dielectric plate with a temperature sensor there in and a heating element. The die has a second insulator dielectric plate and an end plate. A plurality of bolts couple the components of the die. A method of constructing the die renders the components easily disassembled, cleaned and assembled.

5 Claims, 3 Drawing Sheets

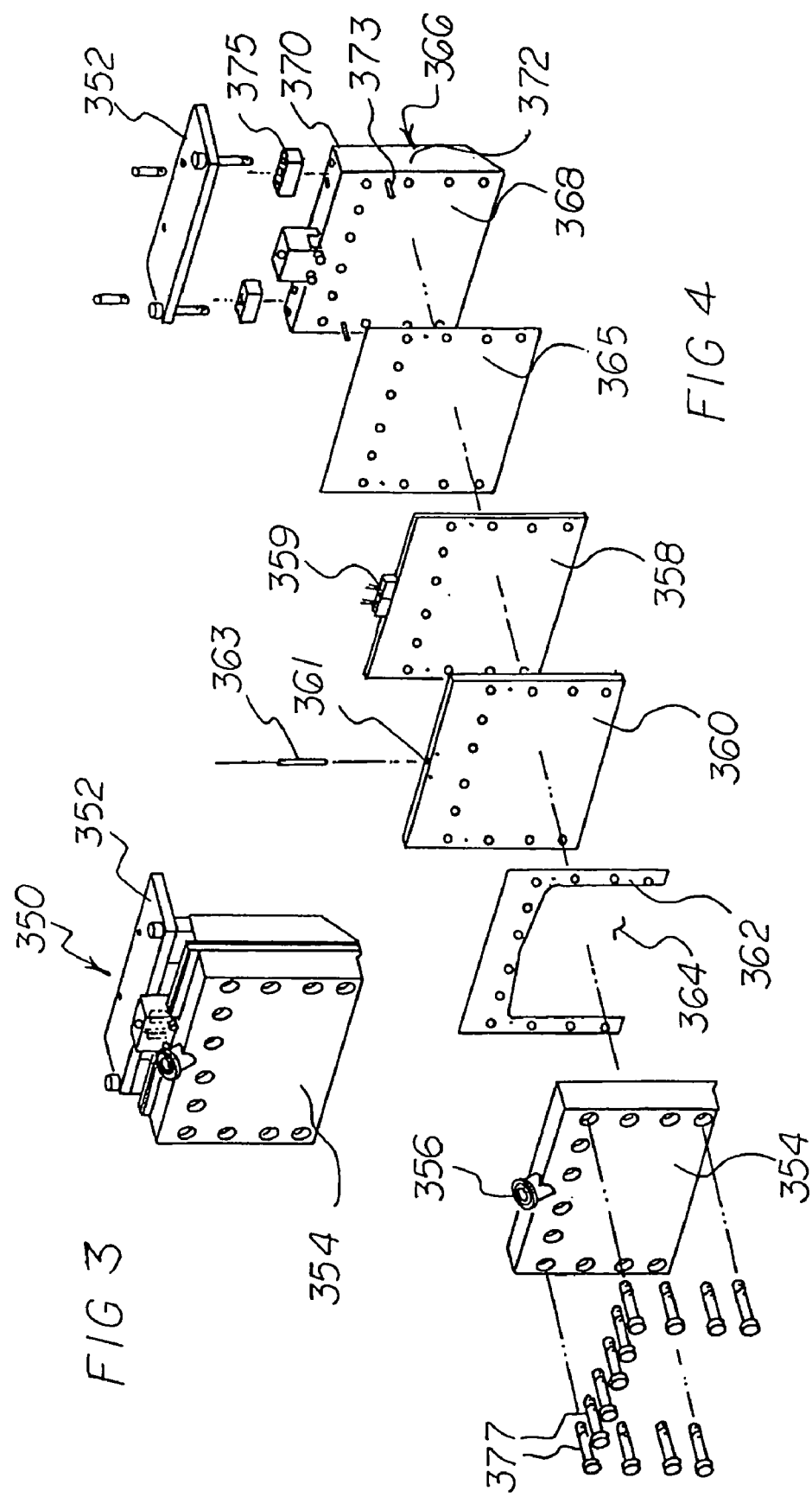

PRESSURIZED PLATE-HEATED MATERIAL DIE AND METHOD OF CONSTRUCTING A PRESSURIZED PLATE-HEATED DIE

RELATED APPLICATIONS

This application is a division divisional application of a Continuation-in-Part (CIP) patent application Ser. No. 10/724,672 filed Dec. 1, 2003 now U.S. Pat. No. 7,036,291. The CIP application number 10/724,672 is entitled Pressurized Sanitary Precision Polymer Film Casting and Dispersion Injection System and Method of Constructing a Pressurized Sanitary Precision Polymer Film Casting and Dispersion Injection System which is a Continuation-in-Part Application of co-pending application, Ser. No. 10/378,183, filed on Mar. 03, 2003 now U.S. Pat. No. 6,823,653.

BACKGROUND OF THE INVENTION

1. Field of the Invention

The present invention relates to a pressurized plate-heated material die and method of constructing a pressurized plate-heated die, and more particularly pertains to allowing a user to inject a liquid polymer under pressure.

2. Description of the Prior Art

The use of valves and switches is known in the prior art. More specifically, valves and switches previously devised and utilized for the purpose of allowing a user to inject a material under pressure are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,222,980 issued to Stauffer et al on Sep. 16, 1980 discloses a method and apparatus for making a cable. U.S. Pat. No. 4,349,531 issued to Mlodozeniec et al on Sep. 14, 1982 discloses pharmaceutical dosage forms comprising an edible web made by high speed automated equipment. Lastly, U.S. Pat. No. 6,586,489 B2 issued to Gehlsen et al on Jul. 1, 2003 discloses a method of co-extruding foams.

While these devices fulfill their respective, particular objectives and requirements, the aforementioned patents do not describe pressurized plate-heated material die and method of constructing a pressurized plate-heated die that allows a user to inject a liquid polymer under pressure.

In this respect, the pressurized plate-heated material die according to the present invention substantially departs from the conventional concepts and designs of the prior art, and in doing so provides an apparatus primarily developed for the purpose of allowing a user to inject a liquid polymer under pressure.

Therefore, it can be appreciated that there exists a continuing need for a new and improved pressurized plate-heated material die which can be used for allowing a user to inject a liquid polymer under pressure. In this regard, the present invention substantially fulfills this need.

SUMMARY OF THE INVENTION

In view of the foregoing disadvantages inherent in the known types of valves and switches now present in the prior art, the present invention provides an improved pressurized plate-heated material die. As such, the general purpose of the present invention, which will be described subsequently in greater detail, is to provide a new and improved pressurized plate-heated material die and method of constructing a pressurized plate-heated die which has all the advantages of the prior art and none of the disadvantages.

To attain this, the present invention essentially comprises a pressurized, plate-heated die system for allowing a user to dispense a liquid in a safe and efficient manner. The system comprising several components, in combination. First provided is a mounting plate. The mounting plate has a rectilinear configuration. The mounting plate has a plurality of bolt holes there through. The mounting plate also has a plurality of die mounting holes there through. Next provided is a distribution plate. The distribution plate has a generally rectilinear configuration and is oriented perpendicular to the mounting plate. The distribution plate has an outside and an inside and a thickness with an edge there between. The edge of the distribution plate has a material feed aperture and a material feed tube coupled there to for the receipt of liquid polymer. The distribution plate has a plurality of bolt holes there through for coupling of the distribution plate. The die has a U-shaped shim having a plurality of bolt holes there through. The shim is coupled to the distribution plate. The shim has the opening of the U, being an extrusion opening, located in a downwardly direction a heater plate. The die has a first insulator dielectric plate having a generally rectilinear configuration and a plurality of bolt holes there through. The dielectric plate has an aperture for the receipt of a temperature sensor there in. The die has a heating element. The heating element has a generally rectilinear configuration. The heating element has an electrical connector for receiving power. The die has a second insulator dielectric plate. The second dielectric plate has a generally rectilinear configuration and a plurality of bolt holes there through. The die also has an end plate. The end plate has a generally rectilinear configuration with an inside and an outside and an edge there between. The inside of the plate has a plurality of threaded bolt holes for receiving bolts. The inside of the end plate also has a plurality of locator pins coupled there to. The end plate has bolt holes on the upper edge to align with the bolt holes of the mounting plate. The die also has a plurality of spacers associated with the mounting plate and the end plate. Lastly, the system has a plurality of bolts to couple the components of the die.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pressurized plate-heated material die which has all of the advantages of the prior art valves and switches and none of the disadvantages.

It is another object of the present invention to provide a new and improved pressurized plate-heated material die which may be easily and efficiently manufactured and marketed.

It is a further object of the present invention to provide a new and improved pressurized plate-heated material die which is of durable and reliable constructions.

An even further object of the present invention is to provide a new and improved pressurized plate-heated material die which is susceptible of a low cost of manufacture with regard to both plate-heated materials and labor, and which according is then susceptible of low prices of sale to the consuming public, thereby making such pressurized plate-heated material die economically available to the buying public.

Even still another object of the present invention is to provide a pressurized plate-heated material die for allowing a user to inject a liquid polymer under pressure.

Lastly, it is an object of the present invention to provide a new and improved pressurized, plate-heated die system, comprising several components in combination. The die has a distribution plate having a material feed aperture and a material feed tube coupled there to. The die has a C-shaped shim, a first insulator dielectric plate having a temperature sensor there in and a heating element. The die also has a second insulator dielectric plate, an end plate, and a plurality of bolts to couple the components of the die.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view of the intact, isolated die.

FIG. 4 is an exploded view of the die system showing the components and the relation with one another.

The same reference numerals refer to the same parts throughout the various Figures.

DESCRIPTION OF THE PREFERRED EMBODIMENT

Figure 1:
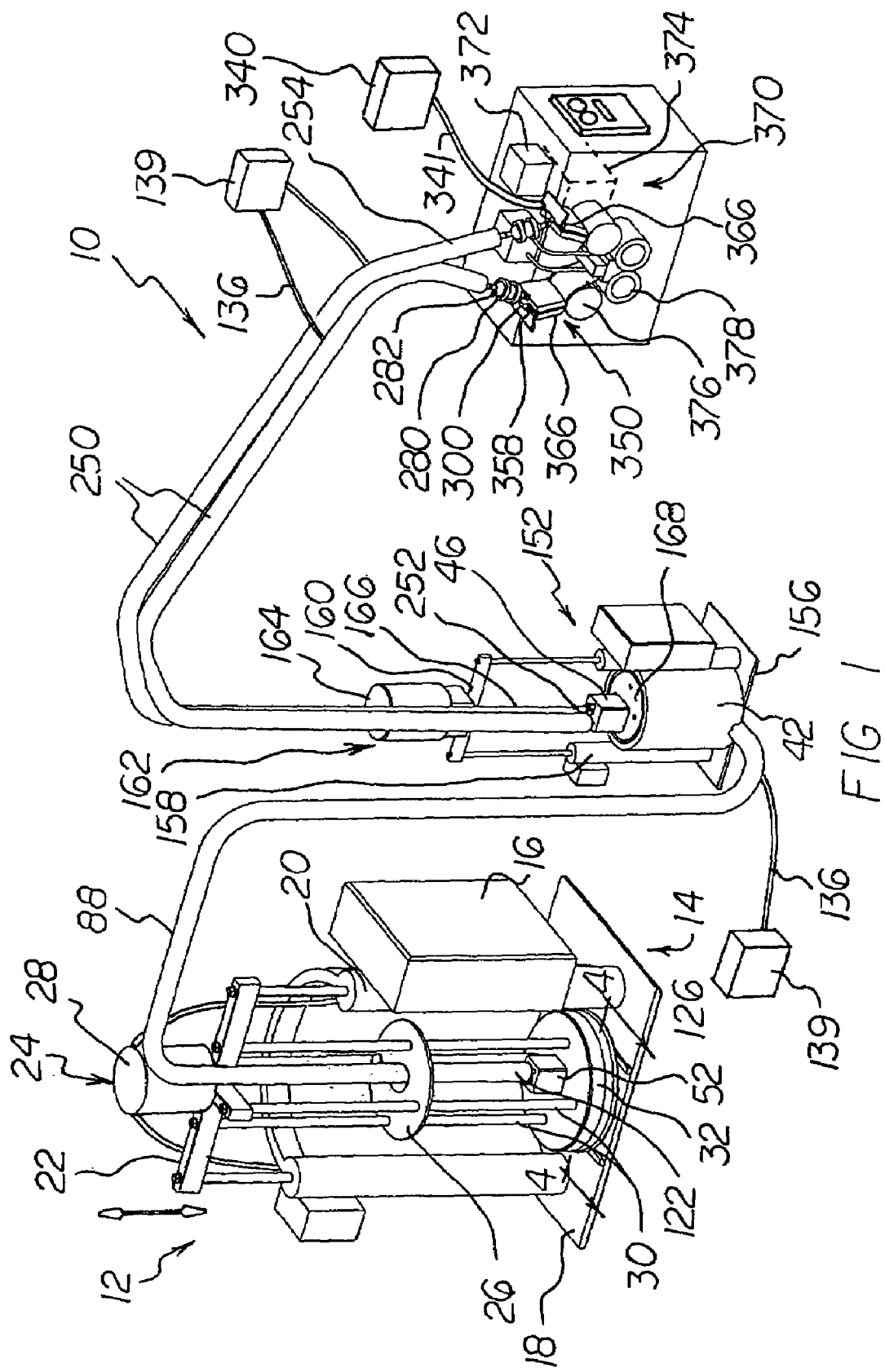
FIG. 1 is a perspective overview of the system in which the die system could be employed.
Figure 2:
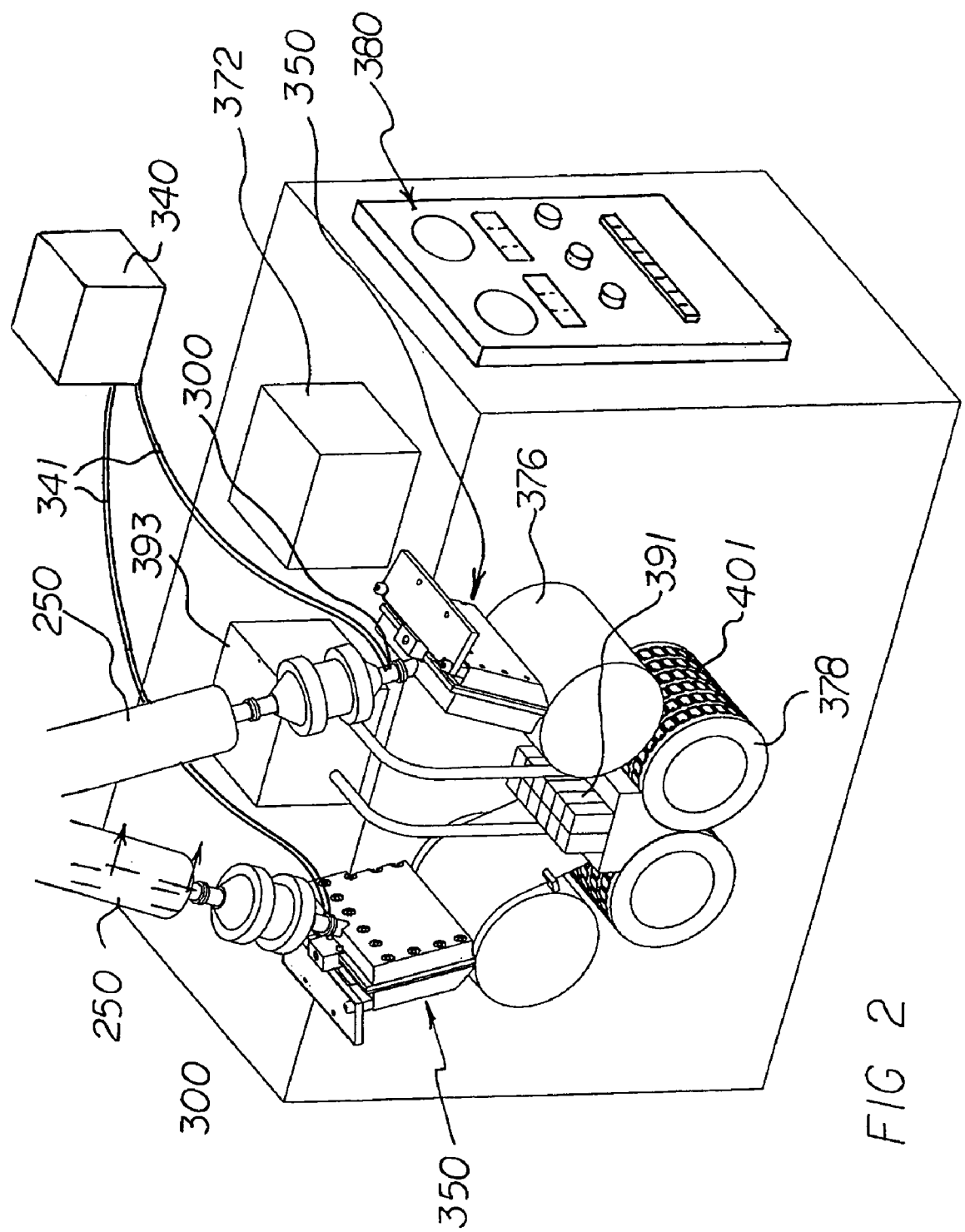
FIG. 2 is a close-up of the die system in place in an existing system.

With reference now to the drawings, and in particular to FIG. 1 thereof, the preferred embodiment of the new and improved pressurized plate-heated material die embodying the principles and concepts of the present invention and generally designated by the reference numeral 350 will be described.

The present invention, the pressurized plate-heated material die 350 is comprised of a plurality of components. Such components in their broadest context include a distribution plate, a plurality of dielectric plates, a heater and an end plate. Such components are individually configured and correlated with respect to each other so as to attain the desired objective.

The pressurized, plate-heated die system allows a user to dispense a liquid in a safe and efficient manner. The system comprising several components, in combination.

First provided is a mounting plate 352. The mounting plate has a rectilinear configuration. The mounting plate has a plurality of bolt holes there through. The mounting plate also has a plurality of die mounting holes there through.

Next provided is a distribution plate 354. The distribution plate has a generally rectilinear configuration and is oriented perpendicular to the mounting plate. The distribution plate has an outside and an inside and a thickness with an edge there between. The edge of the distribution plate has a material feed aperture 356 and a material feed tube coupled there to for the receipt of liquid polymer. The distribution plate has a plurality of bolt holes there through for coupling of the distribution plate.

The die has a U-shaped shim 362 having a plurality of bolt holes there through. The shim is coupled to the distribution plate. The shim has the opening of the U, being an extrusion opening, located in a downwardly direction a heater plate.

The die has a first insulator dielectric plate 360 having a generally rectilinear configuration and a plurality of bolt holes there through. The dielectric plate has an aperture 361 for the receipt of a temperature sensor 363 there in.

The die has a heating element 358. The heating element has a generally rectilinear configuration. The heating element has an electrical connector 359 for receiving power.

The die has a second insulator dielectric plate 365. The second dielectric plate has a generally rectilinear configuration and a plurality of bolt holes there through.

The die also has an end plate 366. The end plate has a generally rectilinear configuration with an inside 368 and an outside 370 and an edge 372 there between. The inside of the plate has a plurality of threaded bolt holes for receiving bolts. The inside of the end plate also has a plurality of locator pins 373 coupled there to. The end plate has bolt holes on the upper edge to align with the bolt holes of the mounting plate.

The die also has a plurality of spacers 375 associated with the mounting plate and the end plate.

Lastly, the system has a plurality of bolts 377 to couple the components of the die.

The present invention also includes a method of constructing a pressurized, plate-heated die system for allowing a user to dispense a liquid in a safe and efficient manner. The method includes the following steps.

The first step is providing a mounting plate having a rectilinear configuration, the mounting plate having a plurality of bolt holes there through, the mounting plate also having a plurality of die mounting holes there through.

The next step is providing a distribution plate having a generally rectilinear configuration and being oriented perpendicular to the mounting plate, the distribution plate having an outside and an inside and a thickness with edge there between, the edge of the distribution plate having a material feed aperture and a material feed tube coupled there to for the receipt of liquid polymer, the distribution plate having a plurality of bolt holes there through for coupling of the distribution plate whereby the distribution plate forms one end of the die system.

The next step is providing a U-shaped shim having a plurality of bolt holes there through, the shim being coupled to the distribution plate, the shim having the opening of the U being an extrusion opening and located in a downwardly direction a heater plate therefore allowing material within the confines of the shim to be moved in a downwardly direction.

The next step is providing a first insulator dielectric plate having a generally rectilinear configuration and having a plurality of bolt holes there through, the dielectric plate having an aperture for the receipt of a temperature sensor there in with the first insulator being operatively coupled to the shim.

The next step is providing a heating element having a generally rectilinear configuration thereby allowing for an even heat across the surface of the heating element, the heating element having an electrical connector for receiving power with the heating element being operatively coupled to the first insulator thereby allowing transfer of heat from the heating element through the insulator while monitoring the temperature of the first insulator plate.

The next step is providing a second insulator dielectric plate having a generally rectilinear configuration and having a plurality of bolt holes there through with the second insulator plate being operative coupled to the heating element.

The next step is providing an end plate having a generally rectilinear configuration with an inside and an outside and an edge there between, the inside of the plate having a plurality of threaded bolt holes for receiving bolts, the inside of the end plate also having a plurality of locator pins, with the end plate having bolt holes on the upper edge to align with the bolt holes of the mounting plate.

The next step is providing a plurality of spacers associated with the mounting plate and the end plate.

The final step is coupling the components of the die by a plurality of bolts whereby the components may be easily disassembled and cleaned and assembled.

It should be understood by one skilled in the art that the concepts of the present invention include the use of a heater in a plate configuration. Such configuration allows for the rapid dissipation of heat along with a fine control over the temperature range of the heated material. The dielectric plate has a heat sensor which reflects the interface heat, that is, the heat between the material and the heating element. The use of plate technology, the configuration of all elements of the invention having a rectilinear configuration, allows for easy disassembly, cleaning and re-assembly. The presence of flat surfaces lends itself to easy cleaning and sanitizing. This aspect of the invention allows the device to be "validatable", that is, to be inspected visually for contaminants, or for easy swabbing to prove cleanliness, prior to re-assembly.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, plate-heated materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A pressurized, plate-heated die system for allowing a user to dispense a liquid in a safe and efficient manner, comprising in combination:

a mounting plate having a rectilinear configuration, the mounting plate having a plurality of bolt holes there through, the mounting plate also having a plurality of die mounting holes there through;

a distribution plate having a generally rectilinear configuration and being oriented perpendicular to the mounting plate, the distribution plate having an outside and an inside and a thickness with edge there between, the edge of the distribution plate having a material feed aperture and a material feed tube coupled there to for the receipt of liquid polymer, the distribution plate having a plurality of bolt holes there through for coupling of the distribution plate;

a U-shaped shim having a plurality of bolt holes there through, the shim being coupled to the distribution plate, the shim having the opening of the U being an extrusion opening and located in a downwardly direction a heater plate;

a first insulator dielectric plate having a generally rectilinear configuration and having a plurality of bolt holes there through, the dielectric plate having an aperture for the receipt of a temperature sensor there in;

a heating element having a generally rectilinear configuration, the heating element having an electrical connector for receiving power;

a second insulator dielectric plate having a generally rectilinear configuration and having a plurality of bolt holes there through;

an end plate having a generally rectilinear configuration with an inside and an outside and an edge there between, the inside of the plate having a plurality of threaded bolt holes for receiving bolts, the inside of the end plate also having a plurality of locator pins, with the end plate having bolt holes on the upper edge to align with the bolt holes of the mounting plate;

a plurality of spacers associated with the mounting plate and the end plate; and a plurality of bolts.

2. A pressurized, plate-heated die system, comprising in combination:

a distribution plate having a material feed aperture and a material feed tube coupled there to;

a U-shaped shim;

a first generally rectilinear insulator dielectric plate having a temperature sensor there in;

a generally rectilinear heating element;

a second generally rectilinear insulator dielectric plate;

an end plate; and a plurality of bolts.

3. A pressurized, plate-heated die system as set forth in claim 2 wherein the heating element comprises an electric heating element and the system further comprises a power source to provide current to the heating element.

4. A pressurized, plate-heated die system as set forth in claim 2 wherein the heating element comprises a liquid heating element and the system further includes a source of a heated liquid.

5. A method to construct a pressurized, plate-heated die system for allowing a user to dispense a liquid in a safe and efficient manner, comprising the following steps in combination:

provniding a mounting plate having a rectilinear configuration, the mounting plate having a plurality of bolt holes there through, the mounting plate also having a plurality of die mounting holes there through;

providing a distribution plate having a generally rectilinear configuration and being oriented perpendicular to the mounting plate, the distribution plate having an outside and an inside and a thickness with edge there between, the edge of the distribution plate having a material feed aperture and a material feed tube coupled there to for the receipt of liquid polymer, the distribution plate having a plurality of bolt holes there through for coupling of the distribution plate whereby the distribution plate forms one end of the die system;

providing a U-shaped shim having a plurality of bolt holes there through, the shim being coupled to the distribution plate, the shim having the opening of the U being an extrusion opening and located in a downwardly direction a heater plate therefore allowing material within the confines of the shim to be moved in a downwardly direction;

providing a first insulator dielectric plate having a generally rectilinear configuration and having a plurality of bolt holes there through, the dielectric plate having an aperture for the receipt of a temperature sensor there in with the first insulator being operatively coupled to the shim;

providing a heating element having a generally rectilinear configuration thereby allowing for an even heat across the surface of the heating element, the heating element having an electrical connector for receiving power with the heating element being operatively coupled to the first insulator thereby allowing transfer of heat from the heating element through the insulator while monitoring the temperature of the first insulator plate;

providing a second insulator dielectric plate having a generally rectilinear configuration and having a plurality of bolt holes there through with the second insulator plate being operative coupled to the heating element;

providing an end plate having a generally rectilinear configuration with an inside and an outside and an edge there between, the inside of the plate having a plurality of threaded bolt holes for receiving bolts, the inside of the end plate also having a plurality of locator pins, with the end plate having bolt holes on the upper edge to align with the bolt holes of the mounting plate;

providing a plurality of spacers associated with the mounting plate and the end plate; and providing a plurality of bolts to couple the components of the die whereby the components may be easily disassembled and cleaned and assembled.

* * * * *